United States Patent [19]
Poston

[11] 3,962,824
[45] June 15, 1976

[54] FLOWER POT

[76] Inventor: James T. Poston, 8109 Clover Way, Buena Park, Calif. 90620

[22] Filed: Oct. 4, 1974

[21] Appl. No.: 511,949

[52] U.S. Cl................................. 47/38.1; D35/3 A
[51] Int. Cl.²......................................... A01G 27/00
[58] Field of Search....................... 47/38.1, 38, 34; D35/3 R, 3 A–3 C

[56] References Cited
UNITED STATES PATENTS

| | | | |
|---|---|---|---|
| 135,271 | 1/1873 | Gould | 47/38.1 |
| 209,798 | 11/1878 | Conway | 47/38.1 |
| 1,450,633 | 4/1923 | Hudson | 47/38.1 |
| 2,253,469 | 8/1941 | Markley | 47/38.1 |
| 2,344,202 | 3/1944 | Carlson | 47/38.1 |
| 2,865,137 | 12/1958 | Longacre | 47/38.1 |

*Primary Examiner*—Robert E. Bagwill
*Attorney, Agent, or Firm*—Robert O. Richardson

[57] ABSTRACT

A flower pot having an inner chamber containing a plant or stems of flowers and an outer container into which water may be poured. At the bottom of the inner chamber is an opening covered with a porous plug to permit constant seepage of water into the inner chamber for automatically and continuously supplying water to the contents of the inner chamber.

5 Claims, 4 Drawing Figures

FLOWER POT

BACKGROUND OF PRESENT INVENTION

When people are on vacation, are busy or just forgetful, potted plants do not get the continuous supply of moisture they need. Sometimes the plants are initially over-watered to compensate for the dry period ahead. In either event of too much or too little moisture, plant life is adversely effected. Thus, a need exists for an automatic and continuous water supply for moisturizing the plants.

SUMMARY OF PRESENT INVENTION

In accordance with the present invention an outer container is provided for decorative purposes and to receive a water supply for the plants. This container has an upper portion and a base portion separated by an annular neck collar. An inner chamber is provided with a lower portion which fits down into the outer container and an upper portion into which plant roots are covered with soil. The lower portion of the inner chamber is of reduced diameter to pass through the collar and down into the base portion of the outer container. This lower portion of the inner chamber has an opening in it communicating with the water reservoir in the base portion of the outer container. A porous plug fits over this opening to permit slow water seepage through it and up to the inner chamber where plants exist with their roots in soil.

DETAILED DESCRIPTION OF ILLUSTRATIVE EMBODIMENT

Figure 1:
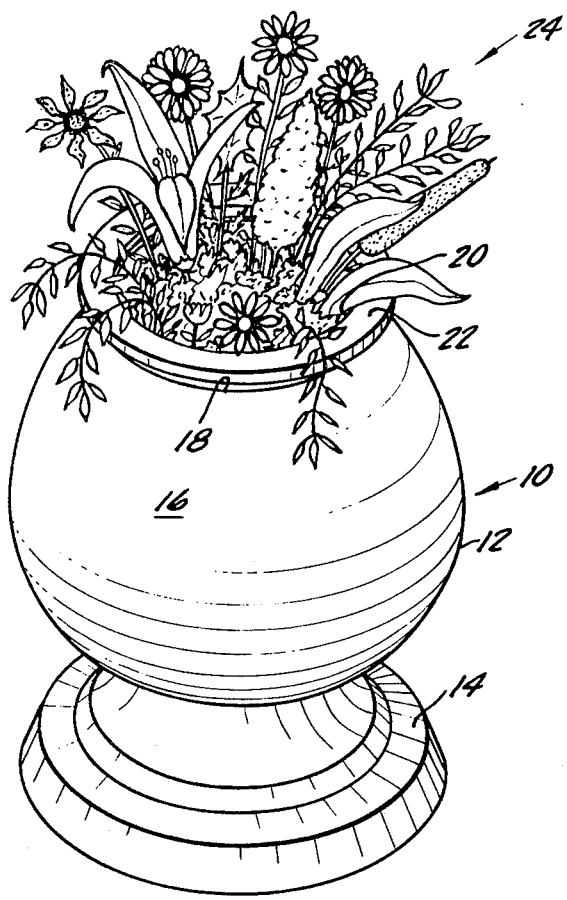
FIG. 1 is a perspective view of the flower pot comprising the present invention.

Referring now to FIG. 1 there is shown a flower pot 10 consisting of an upper portion 12 and base portion 14 of outer container 16. Positioned within the top opening 18 is an inner chamber 20 having an upper outwardly directed annular collar 22 extending on and positioned over the opening 18. Flowers 24 protrude upwardly from inner chamber 20.

Figure 2:
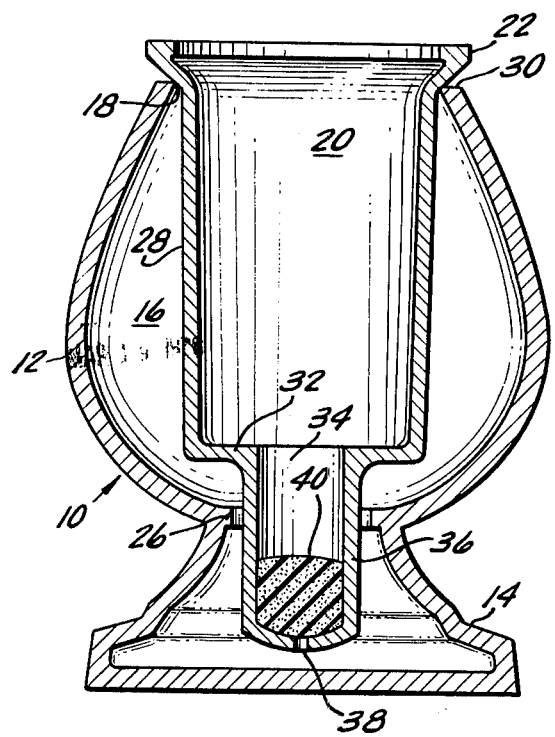
FIG. 2 is a vertical sectional view showing the construction of the pot.

As shown in FIG. 2 the outer container 16 has an inwardly directed collar portion 26 between base 14 and upper portion 12. Base 14 is hollow and serves as a water reservoir. Inner chamber 20 has an upper section 28 into which dirt and plants may be placed. This upper section 28 terminates at its upper end in collar 22 that fits over the opening 18 defined by lip 30 of outer container 16. The lower end of section 28 has a base 32 which supports the dirt and plants. This base 32 has a central bore 34 surrounded by a lower extending lower portion 36 having a lower opening 38 communicating with the inside of base 14. An open cell cellular plug 40 of a material similar to that of an ordinary household kitchen sponge is resiliently wedged within the lower portion 36 of inner chamber 20 and over opening 38. This plug 40 permits slow seepage of water from the reservoir in base 14 up into lower portion 36 and upper section 28 to continually moisturize the plants therein.

Figure 3:
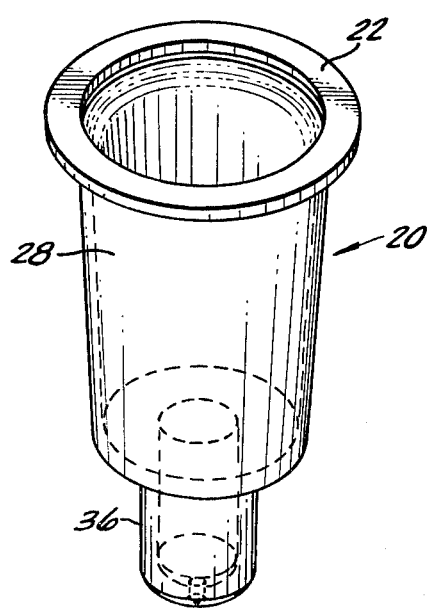
FIG. 3 is a perspective view of the inner chamber.

A perspective view of the inner chamber 20 can be seen in FIG. 3. Here the upper collar 22 extends outwardly at the top of upper section 28 and the lower portion 36 is of lesser diameter to permit insertion within collar 26 of the outer container 16. Water also may pass between the collar 26 and this lower portion 36.

Figure 4:
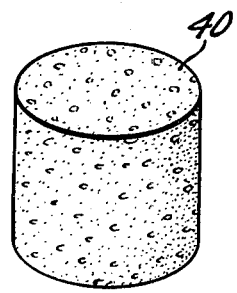
FIG. 4 is a perspective view of the porous plug.

FIG. 4 shows in perspective the porous plug 40. This plug of open cell cellular material is moisture absorbent. It is of any desired convenient thickness and is of a diameter somewhat larger than the inner diameter of the lower portion 36 of inner chamber 20. When inserted there are no excess leakage paths between it and the chamber.

Having thus described an illustrative embodiment incorporating the present invention, it is to be understood that other embodiments may also use the invention. It is to be understood that all modifications and deviations from the illustrative embodiment are to be considered as part of the present invention as set forth in the appended claims.

What is claimed is:

1. A flower pot comprising a water container having a closed base portion and an open upper portion separated by an inwardly directed collar portion, a soil-containing chamber removably received within said container, said chamber having an upper outwardly directed annular collar portion extending over and resting on the upper end of said container, said chamber having an imperforate, substantially cylindrical upper portion and a lower portion of decreased diameter extending through said container collar portion and having an opening therein at the lower portion thereof, a resilient porous plug of greater diameter than said lower portion, received therein, and located directly over said opening, the diameters of said container and chamber upper portions being in a ratio of approximately 2-1 respectively, whereby said container upper portion is adapted to hold a substantial amount of water in addition to that contained in said base portion, which water is wicked through said plug into said soil at a controlled rate for extended periods of time.

2. A flower pot as in claim 1, wherein said base portion is flat and adapted to rest on a supporting surface.

3. A flower pot as in claim 1, wherein said porous plug is a sponge.

4. A flower pot as in claim 1, wherein said container upper portion is globular.

5. A flower pot as in claim 1, wherein said container portions are integral.

* * * * *